United States Patent
Kakinoki et al.

(10) Patent No.: US 10,649,123 B2
(45) Date of Patent: May 12, 2020

(54) OPTICAL FILM, MULTILAYER OPTICAL FILM INCLUDING SAME, AND METHOD FOR PRODUCING OPTICAL FILM

(71) Applicants: MITSUBISHI GAS CHEMICAL COMPANY, INC., Tokyo (JP); MGC FILSHEET CO., LTD., Saitama (JP)

(72) Inventors: Osamu Kakinoki, Tokyo (JP); Koji Komuro, Fukushima (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 294 days.

(21) Appl. No.: 15/327,153

(22) PCT Filed: Jul. 30, 2015

(86) PCT No.: PCT/JP2015/071629
  § 371 (c)(1),
  (2) Date: Jan. 18, 2017

(87) PCT Pub. No.: WO2016/017748
  PCT Pub. Date: Feb. 4, 2016

(65) Prior Publication Data
  US 2017/0168206 A1  Jun. 15, 2017

(30) Foreign Application Priority Data
  Jul. 31, 2014 (JP) ................. 2014-156217

(51) Int. Cl.
  *G02B 5/30* (2006.01)
  *B29C 48/30* (2019.01)
  (Continued)

(52) U.S. Cl.
  CPC ............ *G02B 5/3083* (2013.01); *B29C 41/24* (2013.01); *B29C 48/08* (2019.02); *B29C 48/30* (2019.02);
  (Continued)

(58) Field of Classification Search
  CPC .............. G02B 5/3083; B29C 47/8845; B29D 11/00788
  (Continued)

(56) References Cited

U.S. PATENT DOCUMENTS 4,617,231 A * 10/1986 Hamada ................. B32B 27/04
  428/299.1
5,554,413 A * 9/1996 Nikaido ................. B29C 43/222
  427/108
(Continued)

FOREIGN PATENT DOCUMENTS

JP  03-24502  2/1991
JP  2001-042121  2/2001
(Continued)

OTHER PUBLICATIONS

International Search Report issued in WIPO Patent Application No. PCT/JP2015/071629, dated Oct. 27, 2015.

*Primary Examiner* — Ricky D Shafer
(74) *Attorney, Agent, or Firm* — Greenblum & Bernstein, P.L.C.

(57) ABSTRACT

Provided are: an optical Elm that has a good appearance, small in-plane retardation Re, and large thickness-direction retardation Rth; and a method for producing such an optical film. Also provided is a multilayer optical film that uses the optical film, that exhibits little change in retardation as a result of wavelength, and that has small retardation at low wavelengths. The optical film is obtained by sandwiching a melted resin between a first cooling roll comprising an elastic metal roll and a second cooling roll comprising a non-elastic metal roll and molding said melted resin. The optical film has a good appearance, the absolute value of the in-plane retardation Re thereof is 10 nm or less, and the thickness-direction retardation Rth thereof is 40 nm or more.

10 Claims, 3 Drawing Sheets

(51) Int. Cl.
*B29C 48/305* (2019.01)
*B29C 48/88* (2019.01)
*B32B 27/36* (2006.01)
*B29C 41/24* (2006.01)
*B32B 27/30* (2006.01)
*B32B 7/02* (2019.01)
*B32B 27/00* (2006.01)
*B29C 48/92* (2019.01)
*B29C 48/08* (2019.01)
*B29D 11/00* (2006.01)
*B29C 48/00* (2019.01)
*B29K 101/12* (2006.01)
*B29K 105/00* (2006.01)

(52) U.S. Cl.
CPC .......... *B29C 48/305* (2019.02); *B29C 48/914* (2019.02); *B29C 48/92* (2019.02); *B29D 11/00788* (2013.01); *B32B 7/02* (2013.01); *B32B 27/00* (2013.01); *B32B 27/30* (2013.01); *B32B 27/36* (2013.01); *B29C 48/0011* (2019.02); *B29C 48/0018* (2019.02); *B29K 2101/12* (2013.01); *B29K 2105/0005* (2013.01); *B29K 2995/0018* (2013.01); *G02F 2413/11* (2013.01)

(58) Field of Classification Search
USPC .............................................. 359/489.07, 900
See application file for complete search history.

(56) References Cited

U.S. PATENT DOCUMENTS

| | | | |
|---|---|---|---|
| 5,658,514 A * | 8/1997 | Fujii | ........................ B29C 43/22 264/210.2 |
| 7,255,500 B2 * | 8/2007 | Kido et al. | |
| 8,158,218 B2 * | 4/2012 | Yamada et al. | |
| 8,257,611 B2 | 9/2012 | Uehira et al. | |
| 2007/0188686 A1 * | 8/2007 | Yano et al. | |
| 2008/0198303 A1 | 8/2008 | Taguchi | |
| 2009/0033839 A1 * | 2/2009 | Fukuda | |
| 2009/0046228 A1 | 2/2009 | Takeda et al. | |
| 2009/0286098 A1 | 11/2009 | Yajima et al. | |
| 2010/0045901 A1 | 2/2010 | Uehira et al. | |
| 2010/0149638 A1 | 6/2010 | Kashima et al. | |
| 2011/0058131 A1 * | 3/2011 | Ishiguro | |
| 2011/0253932 A1 | 10/2011 | Kashima et al. | |
| 2012/0169970 A1 * | 7/2012 | Fukuda et al. | |
| 2013/0083273 A1 * | 4/2013 | Fukuda et al. | |
| 2013/0093992 A1 * | 4/2013 | Takahashi et al. | |
| 2014/0036175 A1 * | 2/2014 | Morishima et al. | |
| 2014/0184992 A1 * | 7/2014 | Sekiguchi et al. | |

FOREIGN PATENT DOCUMENTS

| | | |
|---|---|---|
| JP | 2001-337222 | 12/2001 |
| JP | 2002-302543 | 10/2002 |
| JP | 2004-149639 | 5/2004 |
| JP | 2007-094206 | 4/2007 |
| JP | 2007-156433 | 6/2007 |
| JP | 2008-111978 | 5/2008 |
| JP | 2008-197638 | 8/2008 |
| JP | 2008-241994 | 10/2008 |
| JP | 2008-273925 | 11/2008 |
| JP | 2010-042597 | 2/2010 |
| JP | 2011-123252 | 6/2011 |
| JP | 2011-248042 | 12/2011 |
| TW | 200740588 A | 11/2007 |
| WO | WO 2007/081046 * | 7/2007 |

* cited by examiner

OPTICAL FILM, MULTILAYER OPTICAL FILM INCLUDING SAME, AND METHOD FOR PRODUCING OPTICAL FILM

TECHNICAL FIELD

The present invention relates to an optical film that can be used for optical use, flat panel display use and the like, and a method for producing the same. More particularly, the present invention relates to an optical film that has small in-plane retardation Re and large thickness-direction retardation Rth which can be obtained, for example, by melt extrusion molding, and a method for producing the same. The present invention also relates to a multilayer optical film obtained by layering the above-described optical film as a retardation film.

BACKGROUND ART

Recently, for optical use and liquid crystal display use, an optical film that has excellent transparency and small in-plane retardation Re has been needed. In a VA mode liquid crystal cell, the refractive index in the direction vertical to the screen (thickness direction) is greater than the refractive index in the in-plane direction. Therefore, in order to improve the viewing angle in the VA mode, a film with a retardation where the refractive index in the thickness direction is smaller than the refractive index in the in-plane direction is required.

In order to obtain a film like the above-described film, a method for obtaining a retardation film is proposed in which a polycarbonate film is formed by solution casting, which is then sequentially and biaxially extruded in a state where it contains a certain amount of solvent (for example, Patent literature 1).

As another film formation method, there is a method according to which a film with small in-plane retardation is obtained by touch roller molding that uses an elastic metal roller.

According to a method for producing a thin film described in Patent literature 1, there is a part where the film does not make contact with the touch roller, and thus it is difficult to obtain a film with good appearance. Moreover, even the above-described touch roller molding that uses the elastic metal roller has difficulty in producing a film with sufficiently small in-plane retardation.

Furthermore, along with the recent expansion of the thin-type display market represented by liquid crystal televisions, there is an increasing need for a clearer image at a lower price. In order to realize this, various optical films, typically retardation films, are crucial.

Recently, along with the particularly increasing requirement for color reproducibility, there is a need for a polarizing plate protection film and a retardation film for liquid crystal display devices whose change in the retardation due to the wavelength of light is small. With respect to the conventionally utilized retardation films, a polycarbonate film as a polymer film with a positive intrinsic birefringence value, a styrene-based film for optical use as a film with a negative intrinsic birefringence value, and the like have been developed (Patent literature 2).

For such conventional films, however, change in the retardation due to the wavelength has not fully been considered. In addition, the thickness-direction retardation Rth as well has not been considered upon designing.

Patent literature 3 discloses, for the purpose of enhancing the image quality of a liquid crystal display device, use of a multilayer film upon making a so-called reverse wavelength dispersion-type film in which the retardation value becomes larger as the wavelength becomes longer. Specifically, it is a multilayer film made from a piece of polymer-blend film of polyphenylene oxide and polystyrene, which is obtained by layering a retardation plate that has a wavelength band with a positive retardation value (in-plane retardation Re) and a wavelength band with a negative retardation value at a wavelength of 400-700 nm, with a retardation film made from, for example, polycarbonate, in which the retardation value is positive or negative at a wavelength of 400-700 nm.

Even in Patent literature 3, however, the thickness-direction retardation Rth was not considered.

Patent literature 1: Japanese Patent Laid-Open No. 2004-149639
Patent literature 2: Japanese Patent Laid-Open No. H03 (1991)-24502
Patent literature 3: Japanese Patent Laid-Open No. 2001-42121

SUMMARY OF INVENTION

Technical Problem

The objective of the present invention concerning an optical film is to realize a film that has a small in-plane retardation Re and a large thickness-direction retardation Rt, and a method for producing such a film by a melt casting film formation method or the like.

In addition, a problem of the present invention concerning a multilayer optical film is to provide a multilayer optical film whose change in the retardation due to the wavelength is small or whose retardation at a lower wavelength is small, by using the above-described optical film while considering the thickness-direction retardation Rth.

Solution to Problem

In order to solve the above-described problem concerning optical films, the present inventors have gone through keen studies, as a result of which they found that a film with a small in-plane retardation Re and a large thickness-direction retardation Rth can be obtained. The present invention was achieved based on this finding.

Thus, the present invention provides the following optical film.

(I) An optical film whose absolute value of an in-plane retardation Re represented by Formula (1) below at a wavelength of 550 nm is 10 nm or lower, and whose thickness-direction retardation Rth represented by Formula (2) below at a wavelength of 550 nm is 40 nm or more:

$$Re = (Nx - Ny) \times d \quad (1)$$

$$Rth = ((Nx + Ny)/2 - Nz) \times d \quad (2)$$

(in Formulae (1) and (2), Nx represents a refractive index in a direction with the largest refractive index on the plane of the film, Ny represents a refractive index in a direction vertical to the Nx direction, Nz represents a refractive index in the thickness direction of the film, and d represents the thickness of the optical film).

(II) The optical film according to (I) above, comprising one or more selected from the group consisting of a polycarbonate-based resin, a polyphenylene ether-based resin, a cellulose ester-based resin, a norbornene-based resin, a cycloolefin polymer-based resin, a polyester-based resin, a polyamide-based resin and a polystyrene-based resin.

(III) The optical film according to (II) above, comprising one or more selected from the group consisting of a polycarbonate resin, a polyphenylene ether-based resin and a polystyrene resin.

(IV) A negative C-plate comprising the optical film of any one of (I)-(III) above.

(V) A method for producing the optical film of any one of (I)-(III) above, comprising a step of holding and molding a molten resin as a material of the optical film between an elastic metal roller as a first cooling roller and a non-elastic metal roller as a second cooling roller.

(VI) The method for producing an optical film according to (V) above, wherein, in the step of holding and molding the molten resin as the material of the optical film between the first and second cooling rollers, the linear pressure upon holding is 5-25 kgf/cm, the take-up speed is 8-20 m/min, and the surface temperature (Tr) of the first and second rollers is (Th−10° C.)≤Tr≤(Th+20° C.) with respect to the thermal deformation temperature (Th) of the resin.

The present inventors have also gone through keen studies in view of the above-described problem concerning the multilayer film. As a result, they found that a retardation plate with less change in the retardation due to the viewing angle can be obtained and productivity thereof can be enhanced by layering an optical film made from a resin composition P containing a resin A with a positive intrinsic birefringence value and a resin B with a negative intrinsic birefringence value with a film that has a small in-plane retardation and a large thickness-direction retardation. The present invention was accomplished based on this finding.

Here, the above-mentioned resin B with a negative intrinsic birefringence value in the optical film is, for example, a polystyrene resin. Preferably, in the above-described optical film, retardation $R_{450}$ of light with a wavelength of 450 nm at an incident angle 0°, retardation $R_{550}$ of light with a wavelength of 550 nm at an incident angle 0° and retardation $R_{650}$ of light with a wavelength of 650 nm at an incident angle 0° are $R_{450}<R_{550}<R_{650}$, and the thickness-direction retardation Rth in the whole wavelength region of 400-700 nm is negative.

Specifically, the present invention provides the following multilayer optical film.

(VII) A multilayer optical film obtained by layering:

a first optical film made from a resin composition P containing a resin A with a positive intrinsic birefringence value and a resin B with a negative intrinsic birefringence value; with a second optical film that is the optical film of any one of (I)-(III) above, wherein:

(i) the value of in-plane retardation $R_{450}$ (nm) at a wavelength of 450 nm, the value of in-plane retardation $R_{550}$ (nm) at a wavelength of 550 nm and the value of in-plane retardation $R_{650}$ (nm) at a wavelength of 650 nm satisfy relationship $R_{450}<R_{550}<R_{650}$; and (ii) the thickness-direction retardation Rth is −30 nm to 80 nm.

(VIII) The multilayer optical film according to (VII) above, wherein the thickness-direction retardation Rth of the second optical film is 70 nm to 200 nm.

(IX) The multilayer optical film according to either one of (VII) and (VIII) above, wherein the resin A with a positive intrinsic birefringence value is a polyphenylene ether resin.

(X) The multilayer optical film according to any one of (VII)-(IX) above, wherein the resin B with a negative intrinsic birefringence value is a polystyrene resin.

(XI) The multilayer optical film according to any one of (VII)-(X) above, wherein the weight ratio of the resin A and the resin B in the resin composition P is resin A/resin B=1/9-3/7.

(XII) The multilayer optical film according to any one of (VII)-(XI) above, wherein the first optical film is a stretched film made from the resin composition P.

(XIII) The multilayer optical film according to any one of (VII)-(XII) above, wherein the value of retardation $R_{450}$ is 100-125 nm, the value of retardation $R_{550}$ is 125-145 nm, and the value of retardation $R_{650}$ is 130-150 nm.

Advantageous Effects of Invention

According to the present invention, a film with small in-plane retardation Re and large thickness-direction retardation Rth can inexpensively and easily be produced, and the produced optical film can compensate the viewing angle upon combining with a VA mode liquid crystal or other retardation film.

In addition, since a multilayer optical film that has less change in the retardation due to the wavelength, or that can make retardation at a lower wavelength to be smaller can be obtained, the present invention can provide a multilayer optical film that is useful in the market for thin-type display products, typically, liquid crystal televisions.

DESCRIPTION OF EMBODIMENTS

Hereinafter, the present invention will be described in detail.

The present invention relates to an optical film that contains a thermoplastic resin such as polycarbonate and that has small in-plane retardation Re and large thickness-direction retardation Rth, and to a method for producing such optical film by a melt-casting film formation method or the like. Herein, a melt-casting film formation method refers to a method in which a composition containing a thermoplastic resin such as polycarbonate is heated and melted to a temperature that exhibits fluidity, and then the molten substance with fluidity is cast into a film, cooled and solidified to obtain an optical film.

Figure 1:
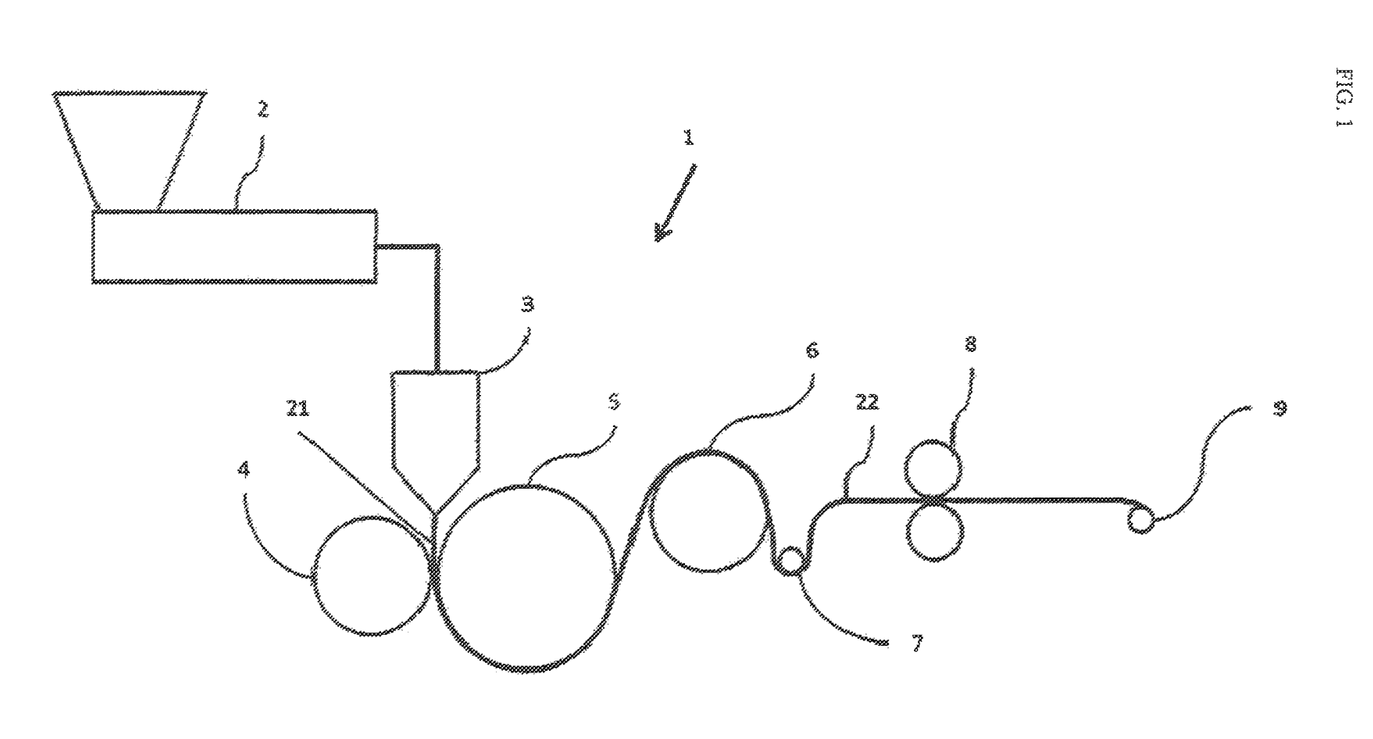
FIG. 1 A view showing an example of an apparatus for producing an optical film.

FIG. 1 is a view showing an example of an apparatus for producing an optical film, which is used for carrying out the present invention. The apparatus 1 for producing an optical film shown in FIG. 1 comprises an extruder 2, a casting die 3, a main roller 5, a touch roller 4, a cooling roller 6, a detaching roller 7, a take-up roller 8 and a take-up device 9.

In this embodiment, a film material containing a thermoplastic resin such as polycarbonate is mixed, then the molten substance containing the thermoplastic resin is extruded from the casting die 3 to form a film using the extruder 2, and the extruded film-shaped molten substance 21 is held and pressed between a non-elastic metal roller, i.e., the main roller 5 and an elastic metal roller, i.e., the touch roller 4. Subsequently, the resultant is sequentially made to circumscribe the single cooling roller 6 to be cooled and solidified, and the detached film 22 is wound by the take-up device 9.

The thermoplastic resin used with the present invention is not particularly limited as long as it can be used for film formation by a melt-casting film formation method. Examples include polycarbonate, alicyclic structure structure-containing polymer, polyvinyl alcohol, polyamide, polyimide and cellulose ester. Among them, polycarbonate is preferable due to good moldability and workability.

Hereinafter, a case where polycarbonate is used as the thermoplastic resin will be exemplified to describe the details. The present invention, however, should not be limited thereto.

According to the present invention, the material may or may not be mixed in advance and directly melted using the extruder 2 to form a film. Alternatively, the film-forming material is once pelletized before being melted with the extruder 2 to form a film. In a case where the film-forming material contains a plurality of materials with different melting points, a half-molten substance in a form of a so-called granular mass can be produced at a temperature that melts only a material with a low melting point before being fed into the extruder 2 to form a film. In a case where a film-forming material contains a material that can easily be decomposed by heating, a method in which a film is directly formed without producing pellets or a method in which a film is formed after preparing a half-molten substance in a form of a so-called granular mass as described above is preferable for the purpose of reducing the number of melting process.

(Extrusion Step)

An extrusion step is a step in which the extruder 2 is used to extrude a molten substance containing a thermoplastic resin into a film shape from the casting die 3.

Although various types of extruders are commercially available as the extruder 2, a melt kneading extruder is preferable among them. Either a single-screw extruder or a twin-screw extruder may be used.

A preferable melting temperature of the film-forming material in the extruder 2 differs depending on the viscosity and the discharge rate of the film-forming material, the thickness of the film to be produced, and the like. In general, it is preferably equal to or higher than the glass transition temperature Tg of the film and equal to or less than Tg+170° C. The melt viscosity upon extruding is 10-100,000 poises, preferably 100-10,000 poises. Moreover, the residence time of the film-forming material in the extruder 2 is preferably as short as possible, for example, it is preferably within 5 minutes. Preferably, the atmosphere inside the extruder 2 is exchanged with an inert gas such as nitrogen gas or argon, or the pressure inside the extruder 2 is reduced so as to reduce the oxygen concentration.

The molten substance discharged from the extruder 2 is fed to the casting die 3 and extruded into a film shape from the casting die 3. The film-shaped molten substance 21 that was extruded from the casting die 3 of the optical film production apparatus 1 shown in FIG. 1 is held and pressed between the touch roller 4 and the main roller 5, and continuously cooled with the cooling roller 6, thereby obtaining a pressed film 22.

If, however, a large amplitude of unevenness is present in a cycle of about several mm to 10 mm, the molten substance may not make adequate contact with the touch roller or the like, or the unevenness may not adequately be straightened even if it can make contact with the roller. In this case, the unevenness that was left unstraightened causes an uneven pressure distribution upon holding and pressing the molten substance, and thus retardation of the resulting optical film will not be uniform and uneven distribution is caused. Accordingly, as to the film-shaped molten substance 21, when the thickness is measured at every 10 mm in the width direction of the pressed region, the maximum thickness difference between the adjacent two positions is preferably 2 μm or less. By doing so, uniformity of the retardation of the produced optical film can further be enhanced.

(Optical Film)

An optical film of the present invention satisfies the following requirements.

The absolute value of the in-plane retardation represented by Numerical expression (1) is 10 nm or less, and the thickness-direction retardation Rth represented by Numerical expression (2) is 40 nm or more.

$$Re=(Nx-Ny)\times d \tag{1}$$

$$Rth=((Nx+Ny)/2-Nz)\times d \tag{2}$$

The above-mentioned in-plane retardation Re and thickness-direction retardation Rth are, for example, values at a wavelength of 550 nm. The thickness-direction retardation Rth is preferably 70 nm to 200 nm.

Furthermore, the absolute value of the in-plane retardation is preferably 5 nm or less.

By satisfying the above-described requirements, the optical film of the present invention is advantageous in that it can favorably be used for compensating the viewing angle of liquid crystal used in a VA mode liquid crystal screen or other optical film with a high thickness-direction refractive index Nz and a negative Rth.

A material for constituting an optical film of the present invention is preferably one or more selected from the group consisting of a polycarbonate-based resin, a polyphenylene ether-based resin, a cellulose ester-based resin, a norbornene-based resin, a cycloolefin polymer-based resin, a polyester-based resin, a polyamide-based resin and a polystyrene-based resin.

<Polycarbonate-Based Resin>

As the polycarbonate-based resin, for example, an aromatic polycarbonate-based resin that is excellent in heat resistance, mechanical strength, transparency and the like can favorably be used.

Examples of the aromatic polycarbonate-based resin include resins obtained by reacting a dihydroxy compound with a carbonate precursor by an interfacial polymerization method or a melt transesterification method, resins obtained by solid-phase polymerization of carbonate prepolymers by a transesterification method, and resins obtained by polymerizing cyclic carbonate compounds by a ring-opening polymerization method.

Examples of the dihydroxy compound include hydroquinone, resorcinol, 4,4'-dihydroxy diphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly called bisphenol A), 2,2-bis{(4-hydroxy-3-methyl)phenyl}propane, 2,2-bis{(4-hydroxy-3,5-dimethyl)phenyl}propane, 2,2-bis{(4-hydroxy-3,5-dibromo)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane (commonly called bisphenol Z), 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantan, 4,4'-dihydroxy diphenylsulfone, 4,4'-dihydroxy diphenyl sulfoxide, 4,4'-dihydroxy diphenyl sulfide, 4,4'-dihydroxy diphenyl ketone, 4,4'-dihydroxy diphenyl ether and 4,4'-dihydroxy diphenyl ester. They may be used alone or two or more types of them may be used as a mixture.

Among them, one or more types of dihydric phenols selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene are preferably used. In particular, singular use of bisphenol A, or combinational use of 1,1-bis(4-hydroxyphenyl)-3,3,5-trimethylcyclohexane with one or more types of dihydric phenols selected from the group consisting of bisphenol A, 2,2-bis {(4-hydroxy-3-methyl)phenyl}propane and α,α'-bis(4-hydroxyphenyl)-m-diisopropylbenzene are preferable.

As the carbonate precursor, for example, carbonyl halide, carbonate ester or haloformate may be used. Specifically, examples include phosgene, diphenylcarbonate and dihaloformates of dihydric phenol.

<Polyphenylene Ether-Based Resin>

As the polyphenylene ether resin used with the present invention, a homopolymer or a copolymer having repeating units represented by General formula [1] below and having [a] and [b] of General formula [1] as the structural units can be used.

[Chemical formula 1]

(wherein, R1, R2, R3, R4, R5 and R6 represent a monovalent residue such as an alkyl group, an aryl group, halogen, hydrogen or the like with 1-4 carbon atoms, where R5 and R6 do not represent hydrogen at the same time).

Specific examples of the homopolymer of the polyphenylene ether resin include homopolymers such as poly(2,6-dimethyl-1,4-phenylene)ether, poly(2-methyl-6-ethyl-1,4-phenylene)ether, poly(2,6-diphenyl-1,4-phenylene oxide), poly(2-methyl-6-phenyl-1,4-phenylene oxide), poly(2,6-dichloro-1,4-phenylene oxide), poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether and poly(2-methyl-6-hydroxyethyl-1,4-phenylene)ether. Above all, poly(2,6-dimethyl-1,4-phenylene)ether is most preferably used.

The polyphenylene ether copolymer includes a polyphenylene ether copolymer that consists essentially of a polyphenylene ether structure, such as a copolymer of 2,6-dimethylphenol and 2,3,6-trimethylphenol, a copolymer of 2,6-dimethylphenol and o-cresol or a copolymer of 2,3,6-trimethylphenol and o-cresol.

In order to improve fluidity and molding workability, the polyphenylene ether resin is usually blended with a polystyrene-based resin so that it is used as a modified polyphenylene ether.

The blending ratio of the two resins is such that the polyphenylene ether-based resin is 10-60% by weight while the polystyrene-based resin is 40-90% by weight, and preferably the polyphenylene ether-based resin is 30-50% by weight and the polystyrene-based resin is 50-70% by weight.

<Cellulose Ester-Based Resin>

Examples of the cellulose ester resin include triacetyl cellulose, diacetyl cellulose, propionyl cellulose, butyl cellulose, acetylpropionyl cellulose and nitrocellulose.

<Cyclic Polyolefin-Based Resin>

Any cyclic polyolefin-based resin can be used as long as it is a polymer that contains a cyclic olefin component in a molecular chain. A homopolymer of cyclic olefin (also referred to as COP), or a copolymer of cyclic olefin and α-olefin (also referred to as COC) can be used. Such a cyclic polyolefin-based resin may appropriately be selected from various commercially available products. Examples of such commercially available products include TOPAS (trade name, manufactured by Polyplastics), APEL (trade name, manufactured by Mitsui Chemicals), ZEONEX (trade name, manufactured by ZEON Corporation), ZEONOR (trade name, manufactured by ZEON Corporation) and ARTON (trade name, manufactured by JSR Corporation).

<Polyester-Based Resin>

Examples of the polyester-based resin include polyethylene terephthalate, polyethylene naphthalate and the like, as well as crystalline polyesters and amorphous polyesters. It is preferably amorphous in terms of transparency.

A polyester-based resin can be composed of a polyester-based resin composition made from a crystalline polyester and an amorphous polyester. A polyester-based resin can be produced by polycondensating a dibasic acid and a polyhydric alcohol.

Examples of the dibasic acid include aromatic dicarboxylic acids such as terephthalic acid, isophthalic acid and 2,6-naphthalenedicarboxylic acid and aliphatic dicarboxylic acids such as adipic acid.

Examples of the polyhydric alcohol include diols such as ethylene glycol, 1,4-butanediol, 1,4-cyclohexane dimethanol, pentaethylene glycol, 2,2-dimethyltrimethylene glycol, hexamethylene glycol and neopentyl glycol.

The above-mentioned dibasic acid and polyhydric alcohol can be used in any combination. Specific examples include a terephthalic acid/ethylene glycol copolymer, a terephthalic acid/ethylene glycol/1,4-cyclohexane dimethanol ternary copolymer, a 2,6-naphthalenedicarboxylic acid/ethylene glycol copolymer and a terephthalic acid/1,4-butanediol copolymer.

An example of the crystalline polyester includes a resin commercially available under the trade name "Vylon" (manufactured by TOYOBO).

Examples of the amorphous polyester include amorphous polyethylene terephthalate (so-called APET), and a terephthalic acid/ethylene glycol/1,4-cyclohexane dimethanol ternary copolymer (e.g., trade name "PETG" (manufactured by Eastman Chemical Company)).

<Polyamide-Based Resin>

The polyamide resin used with the present invention refers to a resin formed of a polymer having an amide bond, which contains an amino acid, lactam or diamine and a dicarboxylic acid as the main raw materials. Examples of the typical raw materials include amino acids such as 6-aminocaproic acid, 11-aminoundecanoic acid, 12-aminododecanoic acid and para-aminomethyl benzoic acid, lactams such as ε-caprolactam and ω-laurolactam, aliphatic, alycyclic and aromatic diamines such as tetramethylene diamine, pentamethylene diamine, hexamethylene diamine, 2-methylpentamethylene diamine, undecamethylene diamine, dodecamethylene diamine, 2,2,4-/2,4,4-trimethylhexamethylene diamine, 5-methylnonamethylene diamine, metaxylene diamine, paraxylylene diamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine and aminoethyl piperazine, and aliphatic, alycyclic and aromatic dicarboxylic acids such as adipic acid, suberic acid, azelaic acid, sebacic acid, dodecanedioic acid, terephthalic acid, isophthalic acid, 2-chloroterephthalic acid, 2-methylterephthalic acid, 5-methylisophthalic acid, 5-sodium sulfoisophthalate, hexahydroterephthalic acid and hexahydroisophthalic acid. According to the present invention, a polyamide homopolymer or copolymer derived from these raw materials may be used alone or as a mixture.

<Polystyrene-Based Resin>

According to the present invention, a styrene-based resin refers to a polymer containing at least a styrene-based monomer as a monomer component. Herein, a styrene-based monomer refers to a monomer that has a styrene skeleton in its structure.

Specific examples of the styrene-based monomer include, besides styrene, vinyl aromatic compound monomers, for example, nucleus alkyl-substituted styrenes such as o-methylstyrene, m-methylstyrene, p-methylstyrene, 2,4-dimethylstyrene, ethylstyrene and p-tert-butylstyrene, as well as α-alkyl-substituted styrenes such as α-methylstyrene and α-methyl-p-methylstyrene. Typically, it is styrene.

The styrene-based resin may be obtained by copolymerizing a styrene-based monomer component with other monomer component. Examples of the monomer that can be used for the copolymerization include: alkyl methacrylates such as methyl methacrylate, cyclohexyl methacrylate, methylphenyl methacrylate and isopropyl methacrylate; unsaturated carboxylic acid alkyl ester monomers, for example, alkyl acrylates such as methyl acrylate, ethyl acrylate, butyl acrylate, 2-ethylhexyl acrylate and cyclohexyl acrylate; unsaturated carboxylic acid monomers such as methacrylic acid, acrylic acid, itaconic acid, maleic acid, fumaric acid and cinnamic acid; unsaturated dicarboxylic anhydride monomers such as anhydrides of maleic acid, itaconic acid, ethylmaleic acid, methylitaconic acid and chloromaleic acid; unsaturated nitrile monomers such as acrylonitrile and methacrylonitrile; conjugated dienes such as 1,3-butadiene, 2-methyl-1,3-butadiene (isoprene), 2,3-dimethyl-1,3-butadiene, 1,3-pentadiene and 1,3-hexadiene, where two or more of them may be copolymerized.

The copolymerization ratio of such other monomer component is preferably 50% or less by mass with respect to the styrene-based monomer component.

As the styrene-based resin, various kinds of styrene-based resins having different compositions, molecular weights or the like can be used in combination.

The styrene-based resin can be obtained by a known anionic, bulk, suspension, emulsion or solution polymerization method.

If necessary, these resins may be added with a compounding agent.

The compounding agent that may be added is not particularly limited, and examples include stabilizers such as a lubricant, inorganic particles, an antioxidant, a heat stabilizer, a light stabilizer, a weathering stabilizer or an ultraviolet absorbent, colorants such as a plasticizer, a dye and a pigment, and an antistatic agent. The amount of the compounding agent can suitably be determined within a range that does not hinder the purpose of the present invention. As the compounding agent, a lubricant and an ultraviolet absorbent are preferably added for the purpose of enhancing flexibility and weatherability. The amount of the compounding agent added may be made to lie, for example, within a range that allows the total light transmittance and haze of the resulting optical film to be maintained at 90% or higher and about 0.2%, respectively.

Examples of the lubricant include inorganic particles such as silicon dioxide, titanium dioxide, magnesium oxide, calcium carbonate, magnesium carbonate, barium sulfate and strontium sulfate, as well as organic particles such as polymethyl acrylate, polymethyl methacrylate, polyacrylonitrile, polystyrene, cellulose acetate and cellulose acetate propionate. According to the present invention, organic particles are preferable as the lubricant.

Examples of the ultraviolet absorbent include an oxybenzophenone-based compound, a benzotriazole-based compound, a salicylic acid ester-based compound, a benzophenone-based ultraviolet absorbent, a benzotriazole-based ultraviolet absorbent, an acrylonitrile-based ultraviolet absorbent, a triazine-based compound, a complex nickel salt-based compound and inorganic powder. Examples of a preferable ultraviolet absorbent include 2,2'-methylene bis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone and 2,2',4,4'-tetrahydroxybenzophenone, and a particularly preferable example includes 2,2'-methylene bis(4-(1,1,3,3-tetramethylbutyl)-6-(2H-benzotriazole-2-yl)phenol.

<Method for Producing Optical Film>

According to the present invention, it is preferable to carry out a process in which a resin composition in a molten state is extruded, and then held and cooled between two cooling rollers.

Examples of the cooling roller include an elastic roller provided with a metal thin film on the outer periphery (hereinafter, sometimes referred to as an elastic metal roller) and a metal roller. Among the cooling rollers, it is important for the present invention that at least one cooling roller is an elastic metal roller. In a case where all of the cooling rollers are metal rollers, it is difficult to make the in-plane retardation of the resulting film to be 10 nm or less since distortion is accumulated on the film-shaped product held between the cooling rollers. On the other hand, distortion accumulated on the film-shaped product held between the cooling rollers can be suppressed by making at least one cooling roller among the cooling rollers to be an elastic metal roller, and the in-plane retardation can certainly be 10 nm or less by adjusting the take-up speed.

The roller constitution is not particularly limited as long as one of the cooling rollers is an elastic metal roller and both two rollers may be elastic metal rollers. In particular, the roller constitution preferably comprises an elastic metal roller and a rigid roller (non-elastic metal roller).

The elastic metal roller is composed of, for example, a generally columnar freely rotatable axial roller, a cylindrical metal thin film that makes contact with the film-shaped product and that is provided to cover the outer peripheral surface of said axial roller and, and a fluid sealed between the axial roller and the metal thin film, where the elastic metal roller exhibits elastic property owing to the fluid.

The axial roller is not particularly limited, and it may be made from, for example, stainless steel or the like.

The metal thin film is made from, for example, stainless steel, whose thickness is preferably about 2-5 mm. The metal thin film preferably has bendability, flexibility and the like, and preferably has a seamless structure without any welded joint part. An elastic metal roller provided with such a metal thin film is convenient since it is superior in durability, can be handled like a usual mirrored surface roller by making the metal thin film to have a mirrored surface, and can be used as a roller that can transfer a pattern or unevenness by imparting such shapes to the metal thin film.

An example of the mirrored surface elastic metal roller that can be used includes UF roller manufactured by Hitachi Zosen Corporation.

As to the size of the cooling roller, usually, the outer diameter is preferably about 200-1000 mm.

The surface temperature (Tr) of the cooling roller is in a range of (Th−20° C.)≤Tr≤(Th+20° C.), preferably (Th−10° C.)≤Tr≤(Th+20° C.) or (Th−15° C.)≤Tr≤(Th+10° C.), and more preferably (Th−10° C.)≤Tr≤(Th+5° C.) with respect to the thermal deformation temperature (Th) of the film-shaped product. If the surface temperature (Tr) is lower than (Th−20° C.), rapid cooling of the film-shaped product may leave distortion on the resulting film-shaped product, whereas if the surface temperature (Tr) is higher than (Th+20° C.), the film-shaped product may stick to and be wound on the cooling roller due to insufficient cooling of the film-shaped product.

The film is wound on the take-up roller. The take-up speed of the take-up roller is preferably 8-20 m/min, more preferably 10-18 m/min and particularly preferably 12-16 m/min.

The linear pressure on the sheet-shaped molten thermoplastic resin material at the center parts of the two cooling rollers is usually 5-25 kgf/cm, preferably 10-20 kgf/cm, and more preferably 12-18 kgf/cm. If the linear pressure is less than 5 kgf/cm, a thermoplastic resin film with a highly accurate thickness and a clean surface may not be obtained since the pressure may be insufficient to press the surface of the molten thermoplastic resin material to form a good surface. On the other hand, if the linear pressure is larger than 25 kgf/cm, orientation of the molten thermoplastic resin material increases since the shear force on the molten thermoplastic resin material becomes larger, which may increase the birefringence index of the resulting optical film.

Figure 2:
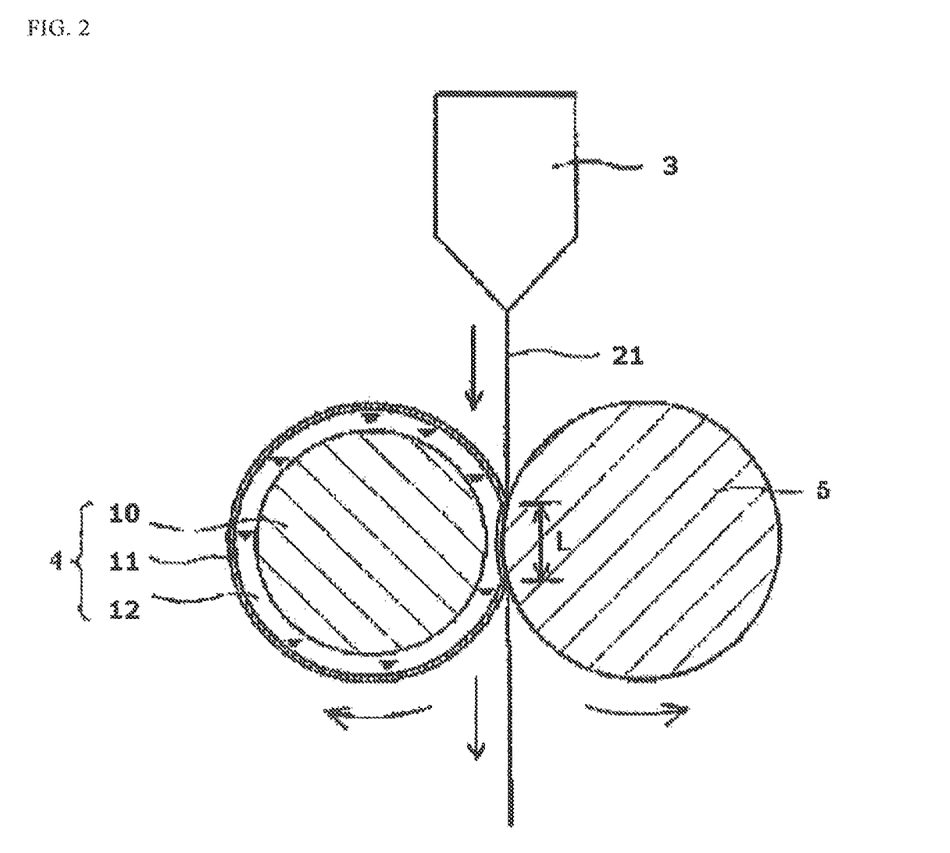
FIG. 2 A view showing a state where a molten resin material is pressurized between an elastic metal roller and a non-elastic metal roller.

In a case where one cooling roller 4 shown in FIG. 1 is an elastic metal roller and the other cooling roller 5 is a metal roller that is substantially not elastic (non-elastic metal roller), the molten thermoplastic resin material 21 can uniformly be pressurized in the width direction between the elastic metal roller and the metal roller. Specifically, as shown in FIG. 2, the elastic metal roller 4 is elastically deformed to have a recessed shape along the outer peripheral surface of the metal roller 5 via the molten thermoplastic resin material 21, where the elastic metal roller 4 makes contact with the metal roller 5 via the molten thermoplastic resin material 21 for a predetermined contact length L (here, although the length L is actually a length of the curve along the curve of the roller, for convenience' sake, it is expressed as a linear distance between a point where the molten thermoplastic resin material 21 is held between the rollers and a point where it leaves the rollers as shown in FIG. 2). Accordingly, the elastic metal roller and the metal roller press the molten thermoplastic resin material 21 by face contact so that the molten thermoplastic resin material held between these rollers is planarly and uniformly pressurized into a film. By making a film in such a manner, good thickness accuracy can be imparted to the resulting optical film, and distortion in the optical film can be prevented.

By combining the metal roller and the elastic metal roller as described above, an optical film with a reduced retardation value can be obtained. Specifically, when a molten resin is held between the metal roller and the elastic metal roller, the elastic metal roller is elastically deformed to have a recessed shape along the outer peripheral surface of the metal roller via the molten resin, where the elastic metal roller makes contact with the metal roller via the molten resin for a predetermined contact length. Accordingly, the metal roller and the elastic metal roller press the molten resin by face contact so that the molten resin held between these rollers is planarly and uniformly pressurized into a film. As a result, distortion upon film formation is reduced, and a resin plate with a reduced retardation value can be obtained.

The extruder may suitably be provided with: a screen mesh for filtering and removing relatively large contaminants and the like in the thermoplastic resin material; a polymer filter for filtering and removing relatively small contaminants, gel and the like in the thermoplastic resin material; a gear pump for stably quantifying the amount of resin to be extruded; and the like.

The optical film of the present invention may favorably be used as a negative C-plate.

Herein, a film having a refractive index $Nx \approx Ny > Nz$ or $Nx \approx Ny < Nz$ is referred to as a C-plate. Since the plane of a C-plate is optically uniform, it does not change polarized light from the front.

A positive C-plate means that the refractive index (Nx) in the direction with the largest refractive index on the plane of the film, the refractive index (Ny) in the direction vertical to the Nx direction on the plane of the film and the refractive index (Nz) in the thickness direction satisfy the relationship $Nx \approx Ny < Nz$.

A negative C-plate means that the refractive index (Nx) in the direction with the largest refractive index on the plane of the film, the refractive index (Ny) in the direction vertical to the Nx direction on the plane of the film and the refractive index (Nz) in the thickness direction satisfy the relationship $Nx \approx Ny > Nz$.

Meanwhile, the in-plane retardation value Re of the above-described C-plate does not necessarily has to be 0 nm as long as it is within a range that gives the working effect of the present invention. Preferably, it is 10 nm (more preferably 5 nm) or less. If it exceeds 10 nm, the front contrast may be deteriorated.

Example 1

Iupilon H4000, a bisphenol A polycarbonate with a viscosity-average molecular weight of 14000-17000, was used to mold a transparent polycarbonate film with a thickness of 100 μm by a melt extrusion method via a T-die as shown in FIG. 1 at a molding temperature of 270° C., which was fed at about 260° C. and cooled between an elastic metal roller with a diameter of 300 mm and a metal roller with a diameter of 400 mm at 135° C. with a gap of 100 μm therebetween to obtain a film with a thickness of 100 μm. At this point, the linear pressure on the molten polycarbonate resin at the center parts of the two cooling rollers was 15 kgf/cm and the take-up speed was 14.5 m/min. In addition, since the thermal deformation temperature (Th) of the polycarbonate resin was 124° C., the difference from the surface temperature (Tr) of the roller was 11° C.

Comparative Example 1

Figure 3:
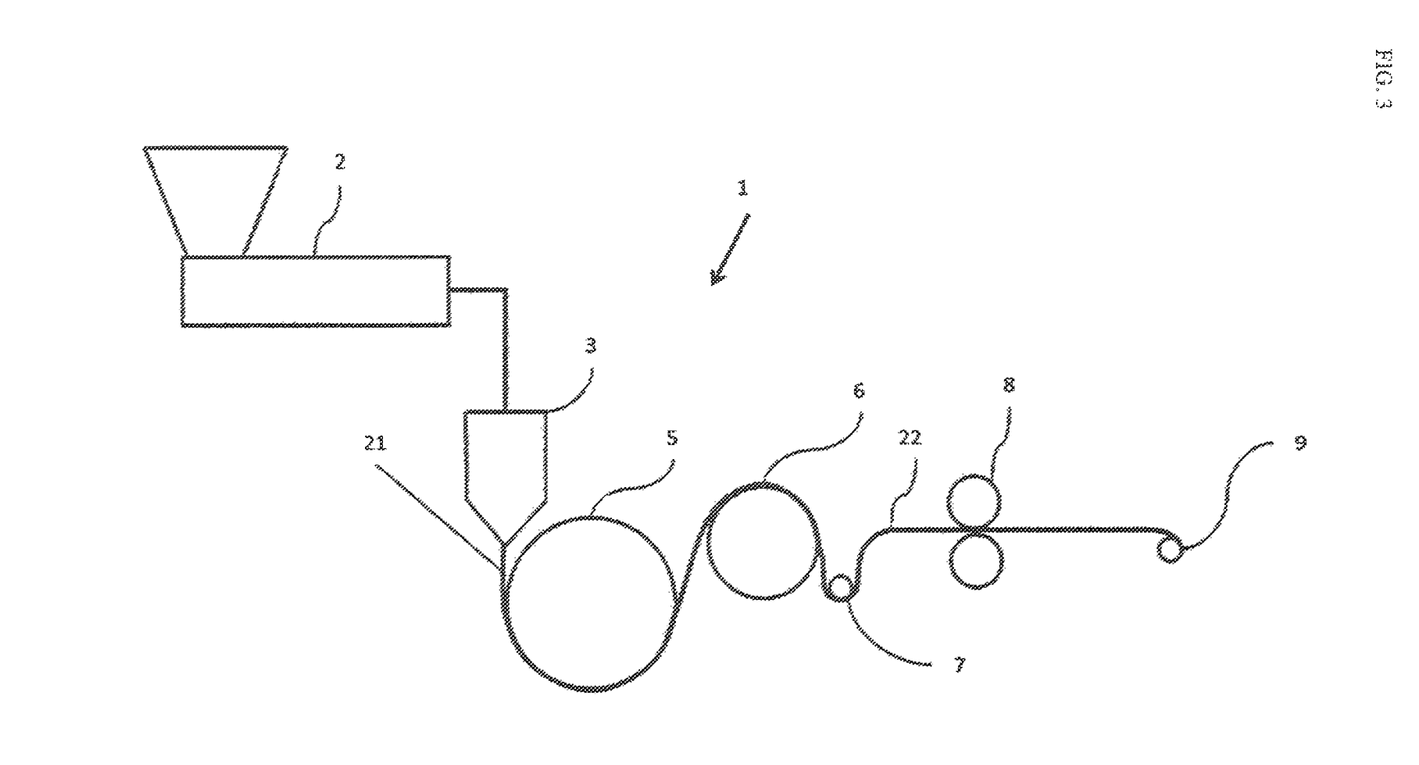
FIG. 3 A schematic view of a production apparatus used in Comparative examples 1 and 2.

A film with a thickness of 100 μm was obtained in the similar manner as Example 1 except that the elastic metal roller 4 was not used (see FIG. 3).

Comparative Example 2

A film with a thickness of 100 μm was obtained in the similar manner as Example 1 except that Iupilon E2000, a bisphenol A polycarbonate with a viscosity-average molecular weight of 27,500, was used instead of Iupilon H4000, a bisphenol A polycarbonate with a viscosity-average molecular weight of 14000-17000, and that the elastic metal roller 4 was not used (see FIG. 3).

[Evaluation Test]

The following properties were examined for the films obtained in Example 1 and Comparative examples 1 and 2 above.

[Retardation]

The films were tilted for ±50° at an increment of 5° using the front direction and the slow axis as the rotation centers to examine the retardation at a wavelength of 550 nm to determine Rth (Retardation film and optical material evaluation system RETS100 manufactured by Otsuka Electronics).

The above-described results are shown in the following table.

TABLE 1

| | Thickness (μm) | Nx | Ny | Nz | Re (nm) | Rth (nm) |
|---|---|---|---|---|---|---|
| Example 1 | 100 | 1.58737 | 1.58728 | 1.58635 | 9.1 | 97.5 |
| Comparative Example 1 | 104 | 1.58720 | 1.58700 | 1.58680 | 21.2 | 31.2 |
| Comparative Example 2 | 107 | 1.58715 | 1.58697 | 1.58688 | 19.3 | 19.3 |

The optical film of Example 1 was confirmed to have a small in-plane retardation Re and a larger thickness-direction retardation Rth as compared to Comparative examples 1 and 2, showing satisfactory properties as a negative C-plate. One of the main reasons for this was that unlike Example 1 in which the polycarbonate resin was held and pressed between the elastic metal roller and the metal roller, the polycarbonate resin was not held and pressed with rollers but solidified with a single cooling roller in Comparative examples 1 and 2. Accordingly, an optical film with excellent properties was confirmed to be producible by the above-described melt casting film formation method of Example 1.

Next, a multilayer optical film of the present invention will be described. The multilayer optical film of the present invention can be obtained by layering a first optical film made from a resin composition P containing a resin A with a positive intrinsic birefringence value and a resin B with a negative intrinsic birefringence value, with the optical film (second optical film) described with reference to the above example. The resin B with a negative intrinsic birefringence value is, for example, a polystyrene resin.

(First Optical Film)

Examples of the resin A with a positive intrinsic birefringence value include: olefin resins such as polyethylene and polypropylene; polyester resins such as polyethylene terephthalate and polybutylene terephthalate; polyarylene sulfide resins such as polyphenylene sulfide; and polyarylene ether resins such as a polyvinyl alcohol resin, a polycarbonate resin, a polyarylate resin, a cellulose ester resin, a polyether sulfone resin, a polysulfone resin, a polyallyl sulfone resin, a polyvinyl chloride resin, a norbornene resin, a rod-like liquid crystal polymer and a polyphenylene ether resin. They may be used alone or two or more of them may be used in combination. Among them, a polycarbonate resin, a norbornene resin and a polyphenylene ether resin are preferable, and a polyphenylene ether resin is particularly preferable, in the present invention in terms of exhibition of retardation. Furthermore, although any known polyphenylene ether resin that has a polyphenylene ether skeleton in the main chain can be used, poly (2,6-dimethyl-1,4-phenylene oxide) that is highly compatible with a polystyrene resin is particularly preferably used.

As resin B with a negative intrinsic birefringence value, a homopolymer or a copolymer of styrene or substituted styrene can be used. Examples of the substituted styrene include: alkylstyrenes such as methylstyrene and 2,4-dimethylstyrene; halogenated styrenes such as chlorostyrene; halogen-substituted alkylstyrenes such as chloromethylstyrene; and alkoxystyrenes such as methoxystyrene. Preferably, it is a homopolymer of a styrene without a substituent.

According to the present invention, the mixing ratio (weight ratio) of the resin A and the resin B with respect to the resin composition P may suitably be selected according to the wavelength dispersion properties of the resins to be mixed, where it is preferably resin A/resin B=1/9-3/7 and more preferably resin A/resin B=2/8-2.5/7.5.

The deflection temperature Ts under load of the resin composition P is preferably 80° C. or higher, more preferably 90° C. or higher and particularly preferably 100° C. or higher. By making the deflection temperature under load to lie within the above-mentioned range, orientation relaxation can be reduced and a first optical film used with the present invention can easily be obtained by a production method described below that employs stretching. In addition, the elongation at break of the resin composition P at temperature Ts is preferably 50% or higher, and particularly preferably 80% or higher. As long as the elongation at break of the resin composition lies within this range, a retardation film can stably be produced by stretching. The elongation at break can be determined by using a test piece of type 1B described in JIS K7127 at a tensile speed of 100 mm/min.

If necessary, the resin composition P may be added with a compounding agent. The compounding agent to be added is not particularly limited, and examples thereof include a lubricant; a lamellar crystal compound; inorganic particles; stabilizers such as an antioxidant, a heat stabilizer, a light stabilizer, a weathering stabilizer, an ultraviolet absorbent and a near-infrared absorbent; a plasticizer: colorants such as a dye and a pigment; and an antistatic agent. The amount of the compounding agent may suitably be determined within a range that does not hinder the purpose of the present invention. As the compounding agent, a lubricant and an ultraviolet absorbent are preferably added in terms of enhancing flexibility and weatherability. The amount of the compounding agent added may be within a range that can maintain, for example, the total light transmittance and the haze of the resulting first optical film at 85% or higher and at about 0.2%, respectively.

Examples of the lubricant added to the resin composition P include: inorganic particles such as silicon dioxide, titanium dioxide, magnesium oxide, calcium carbonate, magnesium carbonate, barium sulfate and strontium sulfate; and organic particles such as polymethyl acrylate, polymethyl methacrylate, polyacrylonitrile, polystyrene, cellulose acetate and cellulose acetate propionate. According to the present invention, the lubricant is preferably organic particles.

Examples of the ultraviolet absorbent added to the resin composition P include an oxybenzophenone-based compound, a benzotriazole-based compound, a salicylic acid ester-based compound, a benzophenone-based ultraviolet absorbent, a benzotriazole-based ultraviolet absorbent, an acrylonitrile-based ultraviolet absorbent, a triazine-based compound, a complex nickel salt-based compound and inorganic powder. Examples of preferable ultraviolet absorbent include 2,2'-methylene bis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone and 2,2',4,4'-tetrahydroxybenzophenone, while a particularly preferable example includes 2,2'-methylene bis(4-(1,1,3,3-tetramethylbutyl)-6-(2H-benzotriazole-2-yl)phenol.

Moreover, an ultraviolet absorbent such as phenylsalicylic acid, 2-hydroxybenzophenone or triphenyl phosphate, a bluing agent for changing the color tone, an antioxidant and the like may also be added.

In terms of adaptability as an optical film, the first optical film used with the present invention preferably has a total light transmittance of 85% or higher and a haze that does not exceed about 0.2%. The above-mentioned total light transmittance is a value determined according to JIS K7361 using haze meter HM150 manufactured by Murakami Color Research Laboratory.

The first optical film used with the present invention has $\Delta YI$ of preferably 5 or less, and more preferably 3 or less. As long as this $\Delta YI$ lies within the above-described range, good visibility with no coloring can be achieved. The $\Delta YI$ value was determined by conducting the same measurements for five times according to JIS Z8722 using "spectrophotometer SE2000" manufactured by Nippon Denshoku Industries, and obtaining an arithmetic mean value thereof.

The first optical film used with the present invention is preferably a film (stretched film) that is stretched after obtaining an unstretched film made from the resin composition P. The total thickness of the first film before stretching is preferably 10-800 µm, and more preferably 50-600 µm. By making the total thickness of the first film before stretching to be 10 µm or more, sufficient retardation and mechanical strength can be obtained. At the same time, by making it to be 800 µm or less, good flexibility and ease of handling can be achieved.

Examples of a method for preparing an unstretched film include known methods, for example, extrusion molding methods such as an extrusion T-die method and an extrusion inflation method.

The first optical film used with the present invention can be obtained by stretching the unstretched film having the above-described structure once or more. Specifically, by stretching the unstretched film having the above-described structure, the resin B exhibits stronger influence than the resin A across the whole range of 400-700 nm. Therefore, the refractive index nz in the thickness direction of the film becomes larger than the in-plane refractive indices nx and ny, and the thickness-direction retardation Rth becomes negative. In this case, the influence of resin B is adjusted to become larger towards the long wavelength side, a reverse wavelength dispersion-type optical film can be obtained. As the stretching process, for example, a method of uniaxially stretching in the longitudinal direction utilizing the difference in the peripheral speed between the rollers (uniaxial stretching in longitudinal direction), a method of uniaxially stretching in the transverse direction utilizing a tenter (uniaxial stretching in transverse direction), a method of sequentially performing uniaxial stretching in the longitudinal direction and uniaxial stretching in the transverse direction (sequential biaxial stretching), or the like can be employed.

(Second Optical Film)

A material of the second optical film, i.e., the film to be layered with the above-described blend resin film (first optical film), that has a positive retardation value at a measurement wavelength of 400-700 nm is preferably a polymer material, where polycarbonate, polyester, polyarylate, polyolefin, polyether, polyphenylene oxide, polysulfone, polyethersulfone, polyvinyl alcohol, amorphous polyolefin, a crystalline polymer, polymerizable liquid crystal or the like that is oriented and then cured is preferably used.

The thickness-direction retardation Rth of the second optical film is preferably 70 nm to 200 nm.

(Multilayer Optical Film)

A multilayer optical film of the present invention satisfies the following requirements (i) and (ii).

<Requirement (i)>

Retardation $R_{450}$ of light with a wavelength of 450 nm at an incident angle 0°, retardation $R_{550}$ of light with a wavelength of 550 nm at an incident angle 0° and retardation $R_{650}$ of light with a wavelength of 650 nm at an incident angle 0° satisfy relationship $R_{450} < R_{550} < R_{650}$.

<Requirement (ii)>

Thickness-direction retardation Rth is −30 nm-80 nm.

Regarding Requirement (i), it is preferably $R450/R550 \leq 0.95$, and more preferably $R450/R550 \leq 0.90$. In addition, it is preferably $0.80 \leq R450/R550$, and the value of R450/R550 is particularly preferably about 0.83. Moreover, it is preferably 1.05≤R650/R550, and more preferably 1.06≤R650/R550≤1.20. In Requirement (i), incident angle 0° refers to the normal direction of the film. A retardation at incident angle 0° can be measured, for example, by using Retardation film and optical material evaluation system RETS100 manufactured by Otsuka Electronics.

The value of retardation $R_{450}$ is preferably 100-125 nm and more preferably about 113 nm while the value of retardation $R_{550}$ is preferably 125-145 nm and more preferably about 138 nm. Furthermore, while the value of retardation $R_{650}$ is ideally 150-175 nm and in particular about 163 nm, it tends to be difficult to maintain the values of retardation $R_{450}$ and $R_{550}$ to lie within the above-mentioned preferable range when the value of retardation $R_{650}$ is adjusted to lie in this range. Considering this point, the value of retardation $R_{650}$ is preferably 130-150 nm, more preferably 135-145 nm and, for example, about 140 nm.

In Requirement (ii), while the thickness-direction retardation Rth may be any value within the above-mentioned range (−30 nm-80 nm) across the whole wavelength region of 400-700 nm, it is preferably 0 nm to 80 nm. Furthermore, it is more preferably 10 nm to 40 nm, and particularly preferably 20 nm to 30 nm.

According to the present invention, as to the resin A and the resin B composing the resin composition P, it is preferable that the wavelength dispersion property of the resin A is greater than that of the resin B. Specifically, provided that the wavelength dispersion property of a film made from the resin A only is expressed as a ratio of an in-plane retardation $R_{450}$ (A) at a wavelength of 450 nm and an in-plane retardation $R_{650}$ (A) at a wavelength of 650 nm (R450 (A)/R650 (A)) and the wavelength dispersion property of a film made only from the resin B is expressed as a ratio of an in-plane retardation $R_{450}$ (B) at a wavelength of 450 nm and an in-plane retardation $R_{650}$ (B) at a wavelength of 650 nm (R450 (B)/R650 (B)), the relationship is preferably (R450 (A)/R650 (A))/(R450 (B)/R650 (B))>1, and more preferably R450 (A)/R650 (A))/(R450 (B)/R650 (B))>1.02.

<Measurement of Retardation>

In order to measure the in-plane retardation Re and the thickness-direction retardation Rth, Retardation film and optical material evaluation system RETS100 manufactured by Otsuka Electronics can be used. Specifically, they can be calculated according to Formulae (1)-(4) below. Specifically, nx, ny and nz are calculated by the three simultaneous equations below where the calculated Re (θ) matches the actually measured Re (θ):

(wherein, Re (0) represents a retardation (nm) upon incidence in the normal direction of the film, d represents the film thickness (nm) and N represents an average refractive index). Then, Rth (nm) is calculated according to Formula (4) below:

$$Rth = ((nx+ny)/2 - nz) \times d \qquad \text{Formula (4)}.$$

<Measurements of Optical Properties>

Light with 550 nm was allowed to enter at 0°, i.e., the direction normal to the plane of the prepared optical film, to measure the retardation value of the incident light by using a measuring instrument (Retardation film and optical material evaluation system RETS100 manufactured by Otsuka Electronics). Then, the sample was tilted at an increment of 5° using the fast axis and the slow axis as the centers to measure the retardation values in the range of −50° to 50°. The resulting in-plane retardation value R0, the retardation value Rθ measured by tilting at the slow axis, i.e., the tilted axis, the thickness d of the film and the average refractive index n0 of the film which was assumed to be 1.59 were used to determine nx, ny and nz by numerical calculation.

Example 2

28 parts by mass of a polyphenylene ether-based resin (PPE) (trade name: PX100L manufactured by Mitsubishi Engineering-Plastics Corporation) and 72 parts by mass of general grade polystyrene (GPPS) (trade name: HH105 manufactured by PS Japan Corporation) were mixed to obtained a total of 100 parts by mass of a positive birefringent material, which was used to produce a film with a thickness of 200 μm by using a film prototyping device equipped with a T-die at 290° C. The prepared film was heated to 125° C. and uniaxially stretched at a stretch ratio of 2.3 times to obtain a film (film 2). The resulting sample and the film (film 1) described in Reference example below were layered using an adhesive. The evaluation results of the optical properties are shown in Table 2.

Reference Example

A film (film 1) with a thickness of 100 μm was prepared in the same manner as Example 1.

Comparative Example 3

The film 2 prepared in Example 2 was evaluated as a single layer.

Comparative Example 4

The film 2 prepared in Example 2 and the film obtained in Comparative example 1 were layered using an adhesive.

[Numerical expression 1]

$$Re(\theta) = \left[ nx - \frac{ny \times nz}{\sqrt{\left(ny \sin\left(\sin^{-1}\left(\frac{\sin(-\theta)}{nx}\right)\right)\right)^2 + \left(nz \cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \qquad \text{Formula (1)}$$

$$Re(0) = (nx - ny) \times d, \text{ and} \qquad \text{Formula (2)}$$

$$N = (nx + ny + nz)/3 \qquad \text{Formula (3)}$$

TABLE 2

|  | R450 | R550 | R650 | R450/ R550 | R650/ R550 | Rth (nm) | Trans- mittance | Haze | Color tone (front) | Color tone (oblique) |
|---|---|---|---|---|---|---|---|---|---|---|
| Example 2 | 127.4 | 144.0 | 153.6 | 0.88 | 1.07 | 4.4 | 89.2 | 0.2 | Good | Good |
| Comparative Example 3 | 115.9 | 135.2 | 146.3 | 0.86 | 1.08 | −94.0 | 90.2 | 0.2 | Poor | Poor |
| Comparative Example 4 | 94.8 | 115.6 | 127.5 | 0.82 | 1.10 | −79.6 | 89.2 | 0.2 | Significantly poor | Significantly poor |

The method for evaluating the color tone in Table 2 was as follows. Each of the films from the examples and the like was placed on an OLED panel without the polarizing plate and a touch panel, and visually observed to evaluate the color tone. As a result, a film that did not color the display and gave good black display was evaluated to be "good". A film with apparent coloring but no color change due to the reflected light was evaluated to be "poor", and a film that gave almost the same display as that in the case of the polarizing plate with no film on the panel, and that imparted whiteness to the display due to the reflected light was evaluated to be "significantly poor".

Hence, in Example 2, a first optical film (film 2 in Example 2) made from a resin composition containing a resin with a positive intrinsic birefringence value and a resin with a negative intrinsic birefringence value whose retardation property is $R_{450}<R_{550}<R_{650}$ and whose thickness-direction retardation Rth is negative across the whole wavelength region of 400-700 nm layered with a second optical film (film 1 in Example 2) whose absolute value of the in-plane retardation is 10 nm or less and whose thickness-direction retardation Rth is 40 nm or more. As a result, a multilayer optical film which (i) satisfies relationship $R_{450}<R_{550}<R_{650}$ and (ii) has a thickness-direction retardation Rth of −30 nm to 80 nm was produced.

As can be appreciated from the results shown in Table 2, the multilayer optical film of Example 2 was confirmed to have excellent properties including transmittance and haze. In particular, when the color tone of the multilayer optical film of Example 2 was evaluated through observation from the front and oblique directions on a panel, it was superior over Comparative examples 3 and 4. Therefore, the multilayer optical film of Example 2 appeared to be applicable as a retardation plate which is not influenced by the reflected light and whose change in the retardation due to the viewing angle is small.

DESCRIPTION OF REFERENCE NUMERALS

2 Extruder
3 Casting die
4 Touch roller
5 Main roller
6 Cooling roller
7 Detaching roller
8 Take-up roller
9 Take-up device
21 Film-shaped molten substance
22 (Pressed) film

The invention claimed is:

1. A method for producing an optical film having an absolute value of an in-plane retardation $R_e$ represented by Formula (1) below at a wavelength of 550 nm is 10 nm or lower, and whose thickness-direction retardation $R_{th}$ represented by Formula (2) below at a wavelength of 550 nm is 40 nm or more:

$$R_e=(Nx-Ny)\times d \quad (1)$$

$$R_{th}=((Nx+Ny)/2-Nz)\times d \quad (2),$$

the method comprising holding and molding a molten resin as a material of the optical film between an elastic metal roller as a first cooling roller and a non-elastic metal roller as a second cooling roller, wherein:
in Formulae (1) and (2), Nx represents a refractive index in a direction with the largest refractive index on the plane of the film, Ny represents a refractive index in a direction vertical to the Nx direction, Nz represents a refractive index in the thickness direction of the film, and d represents the thickness of the optical film; and during the holding and molding the molten resin as the material of the optical film between the first and second cooling rollers, a linear pressure upon holding is 12-25 kgf/cm, a take-up speed is 8-20 m/min, and a surface temperature (Tr) of the first and second rollers is:

$$(Th-10°\ C.)\le Tr\le (Th+20°\ C.)$$

with respect to a thermal deformation temperature (Th) of the resin.

2. The method according to claim 1, said optical film comprising at least one of a polycarbonate-based resin, a polyphenylene ether-based resin, a cellulose ester-based resin, a norbornene-based resin, a cycloolefin polymer-based resin, a polyester-based resin, a polyamide-based resin, and a polystyrene-based resin.

3. The method according to claim 2, said optical film comprising at least one of a polycarbonate resin, a polyphenylene ether-based resin, and a polystyrene resin.

4. A multilayer optical film obtained by layering:
a first optical film made from a resin composition P comprising a resin A with a positive intrinsic birefringence value and a resin B with a negative intrinsic birefringence value; with
a second optical film whose absolute value of an in-plane retardation Re represented by Formula (1) below at a wavelength of 550 nm is 10 nm or lower, and whose thickness-direction retardation $R_t h$ represented by Formula (2) below at a wavelength of 550 nm is 40 nm or more:

$$R_e=(Nx-Ny)\times d \quad (1)$$

$$R_{th}=((Nx+Ny)/2-Nz)\times d \quad (2),$$

wherein:
(i) a value of in-plane retardation $R_{450}$ (nm) at a wavelength of 450 nm, the value of in-plane retardation $R_{550}$ (nm) at a wavelength of 550 nm and a value of in-plane retardation $R_{650}$ (nm) at a wavelength of 650 nm satisfy relationship $R_{450}<R_{550}<R_{650}$;

(ii) the thickness-direction retardation $R_{th}$ is −30 nm to 80 nm across an entire wavelength region of 400 nm to 700 nm; and (iii) Nx represents a refractive index in a direction with the largest refractive index on the plane of the film, Ny represents a refractive index in a direction vertical to the Nx direction, Nz represents a refractive index in the thickness direction of the film, and d represents the thickness of the optical film.

5. The multilayer optical film according to claim 4, wherein the thickness-direction retardation $R_{th}$ of the second optical film is 70 nm to 200 nm at the wavelength of 550 nm.

6. The multilayer optical film according to claim 4, wherein the resin A with a positive intrinsic birefringence value is a polyphenylene ether resin.

7. The multilayer optical film according to claim 4, wherein the resin B with a negative intrinsic birefringence value is a polystyrene resin.

8. The multilayer optical film according to claim 4, wherein a weight ratio of the resin A and the resin B in the resin composition P is resin A/resin B=1/9-3/7.

9. The multilayer optical film according to claim 4, wherein the first optical film is a stretched film made from the resin composition P.

10. The multilayer optical film according to claim 4, wherein the value of retardation $R_{450}$ is 100-125 nm, the value of retardation $R_{550}$ is 125-145 nm, and the value of retardation $R_{650}$ is 130-150 nm.

\* \* \* \* \*